United States Patent [19]

Kirkland

[11] Patent Number: 5,249,162
[45] Date of Patent: Sep. 28, 1993

[54] RADIO FREQUENCY PHASE SENSITIVE WIRE DETECTOR

[75] Inventor: James L. Kirkland, Panama City, Fla.

[73] Assignee: The United States of America as represented by the Secretary of the Navy, Washington, D.C.

[21] Appl. No.: 354,560

[22] Filed: Apr. 20, 1973

[51] Int. Cl.⁵ .................................. H04B 11/00
[52] U.S. Cl. .................................. 367/131; 324/67
[58] Field of Search ............... 324/3, 8, 67, 66; 340/4 R; 343/112 R; 367/131; 342/20

[56] References Cited

U.S. PATENT DOCUMENTS 3,526,831 9/1970 Smith .................................. 324/3 X
3,617,865 11/1971 Hakata .................................. 324/3

Primary Examiner—Daniel T. Pihulic
Attorney, Agent, or Firm—William C. Townsend; Kenneth Dobyns

[57] ABSTRACT

An underwater object detection system and method are described which utilize changing phase relationships between radio waves received by a moving underwater receiver, via a retransmitting underwater object, and radio waves received through air directly from a transmitter. The moving underwater receiver is characterized by an envelope or encapsulation of material of different radio wave propagation rate than that of the water medium, so that a markedly different phase change relation exists when the underwater receiver is in contact with the object.

12 Claims, 1 Drawing Sheet

RADIO FREQUENCY PHASE SENSITIVE WIRE DETECTOR

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

This invention relates to methods and apparatus for detecting the presence and location of a conductor which extends on opposite sides of an air/water boundary, for example, in the case of a command control wire leading from a location on a bank of a body of water to a mine situated in the water. The invention is, of course, applicable to the location of other conductors such as pipes, communication cables, and the like.

An effective sweeping or countermeasure approach to wire controlled mines, in a river for example, requires first the ability to locate the command control wire so that one or more subsequent steps may be taken, such as neutralizing the enemy command station, cutting the command wire to disable the mine, or applying a suitable electrical signal to the wire to cause the mine to explode at a time when no damage will ensue.

The ability to locate such a conductor from a moving vehicle, such as a boat, helicopter, or the like, has been limited to techniques which are either insufficiently reliable or require more complex and expensive equipment than is desirable. For example, one technique has involved towing gradiometer means in the form of first and second, spaced, radio frequency detectors, with the expectation that electromagnetic energy of radio frequency from a radio broadcasting transmitter would be carried by the wire from its air domain to the water domain, where electromagnetic radiations from the wire would there be received by the towed gradiometer means as it passes close by. That technique is described in my patent application Ser. No. 126,938, filed Mar. 22, 1971, and entitled "Wire Detector". While a towed two receiver, radio frequency gradiometer will, in fact, receive such energy, which can be transmitted by cable to the towing vessel for display and/or classification, the requirements of having two radio frequency detectors or receivers housed in a watertight casing and of transmitting data therefrom, either by wire or other telemetering equipment, results in expensive, bulky, tow equipment which is difficult to maintain.

Another approach has been to drag a suitably contained single AM radio receiver along the bottom of a waterway. The radio is shielded by the water from receiving signals of any significant strength directly from a transmitter. As before, a wire or conductor which has portions above and below water will receive radio signals along its exposed position and retransmit radio signals into the water, which signals affect the radio receiver whenever it passes in close proximity to the wire or conductor. The receiver, which utilizes a horizontal loop antenna, detects the signals and, in the case where amplitude modulation of a carrier exists, converts them to an audio frequency modulation signal for operation of a detection indicator or sounder. In the case where no amplitude modulation exists, a D.C. voltage level corresponding to strength of the carrier signal is used to operate an indicator such as a meter.

Such a single receiver system has been found to be inexpensive and workable, but there are times when interference of various sorts reduce the signal to noise ratio below a level at which detection of a wire can be relied upon. Detection by the aforedescribed loop antenna, amplitude technique is based on inductive coupling between the antenna and the radiating wire and provides an increase in audio signal amplitude due to proximity to the radiation into the water from the submerged portion of the wire as compared to the negligible reception of radio waves directly from the transmitter which arrives at the underwater location of the receiver in a greatly attenuated state. The rate of increase and decrease of the detected signal amplitude is characterized by an extremely sharp peak as the leading edge of the coil passes the wire and another extremely sharp peak as the trailing edge of the coil passes the wire. These closely spaced peaks are so short in duration, that even short lapses in monitoring or short occurrences of noise interference can result in missing a wire detection. Accordingly, with a detector being towed at speeds which can give hope of covering or sweeping a worthwhile area in a given time, it is difficult to provide assurance of wire locations.

SUMMARY OF THE INVENTION

The wire or conductor detecting method and apparatus according to this invention aims to overcome most or all of the disadvantages of the prior art by taking advantage of the difference in the speeds of propagation of electromagnetic energy waves in air and in water to produce phase differences in signals that can be readily detected and displayed.

With the foregoing in mind, it is a principal object of the invention to provide an improved method and apparatus for detecting the presence and underwater location of a conductor, such as a wire, extending for some distance both out of and below the water.

Another object of the invention is to provide for improved passive detection of such a conductor by utilizing the effect of radio broadcast signals that act on the above water portion of the conductor to be located so as to produce electromagnetic radiation in the water surrounding the submerged portion thereof at the broadcast radio frequency.

Still another object of the invention is to provide for improved detection of such an underwater, broadcast frequency radiating conductor through the comparison of phase conditions of radiation received by a detector in the water medium to the phase conditions of radiation received directly through the air medium.

Yet another object is to accomplish detection of the presence of the wire or conductor by sensing the rate of change of the phase relation between the radio frequency signals received in the air and water media.

A further object is the provision of detection apparatus utilizing the foregoing principals and which is characterized by automatic indication and/or signaling means to relieve the operators thereof of the burden of continuous human monitoring of chart recorder or oscilloscope tracings during a sweep.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
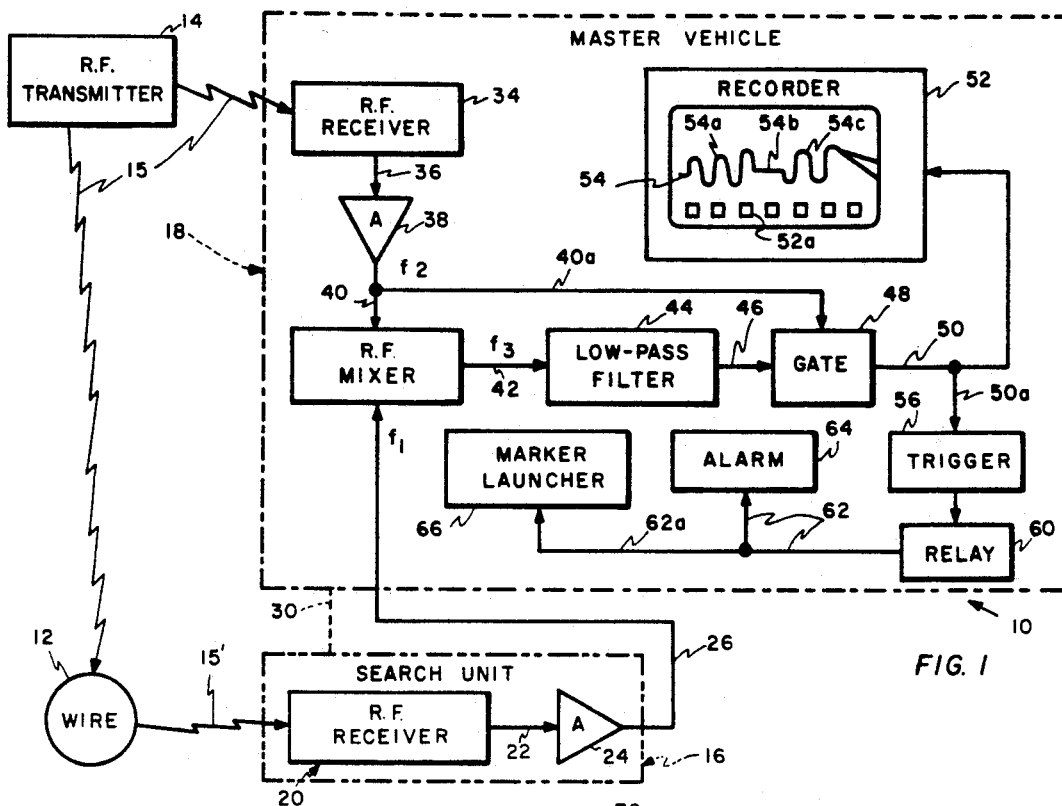
FIG. 1 is a diagrammatic illustration, in block form, of a conductor detecting and locating system embodying the invention.

Referring to FIG. 1, there is illustrated a system, generally indicated at 10, for detecting the presence and location of a conductive element, such as a wire 12, that is so disposed as to have a portion thereof submerged in water and a portion thereof disposed in the atmosphere. Although the conductive element is shown for purposes of example as being a wire 12, it may be in the form of one or more wires, cables, or pipes, either insulated or uninsulated, or in the form of any other conductive object which extends both above and below water.

A radio frequency transmitter 14, which conveniently but not necessarily may be a conventional amplitude modulation commercial broadcasting station, is disposed so as to emit electromagnetic radiation 15 of radio frequency, say on the order of 1000 kilohertz, which will be picked up by the above water portion of wire 12. If a suitable commercial transmitter is not in existence, the invention contemplates provision of a transmitter 14 that may be located either as a permanent or a temporary land supported stationary unit or transmitter 14 may be carried as a mobile unit aboard a suitable land, water, or air vehicle.

Electromagnetic energy from station 14 induces electrical standing wave activity along wire 12 according to well known principles, the above water portion thereof serving as a receiving antenna. Such activity results in the underwater portion of wire 12 acting as a transmitting antenna, whereby electromagnetic energy 15', having the same carrier frequency and modulation (if any) as was received from transmitter 14, is retransmitted into the surrounding water medium.

System 10 comprises a search unit 16, which is advantageously in the form of a mobile probe or vehicle that is towed or otherwise under the control of a master vehicle 18, and which search unit is adapted to be influenced by the presence of any retransmitted electromagnetic energy from the submerged portion of wire 12 whenever the search unit is within relatively close proximity thereto. The nature of that influence, and the manner in which it is used to particular advantage to detect wire 12, will later be more fully discussed in connection with the mode of operation of system 10.

Search unit 16 of this exemplary embodiment comprises an R.F. (radio frequency) receiver 20, which will be described in more detail with reference to FIG. 2 as this specification proceeds, coupled as shown by line 22 to an R.F. amplifier 24. The output of amplifier 24, which amplifier is preferably of the limiting amplifier type for a reason which will presently be made apparent, is connected as shown by line 26 to provide one A.C. voltage input to an R.F. mixer 28 carried by master vehicle 18.

At this point it may be noted that search units 16 may be coupled to the master vehicle as by a tow cable or by remote means such as radio control in the event the search unit is self-propelled. In either event control coupling between search unit 16 and master vehicle 18 is represented by dotted line 30. In the former case connection of the output of amplifier 24 represented by line 26 to mixer 28 may be by through-water telemetering whereas in the latter case connection may be by wire conveniently incorporated in the tow cable.

Master vehicle 18, which in most configurations of the invention will be a water borne vessel, carries, in addition to the mentioned R.F. mixer 28, a second R.F. receiver 34 that is tuned to receive the electromagnetic energy transmission of transmitter 14 directly through the air medium. Receiver 34 is connected as shown by line 36 to an R.F. limiting amplifier 38, the A.C. voltage output of which is connected as shown by line 40 as the second input to R.F. mixer 28.

R.F. mixer 28 may comprise any of several well known constructions. Suffice it to say that the output thereof, represented by line 42, is an A.C. voltage signal having a frequency $f_3$ which is the difference between the frequencies $f_1$ and $f_2$ of the A.C. voltage inputs represented respectively by lines 26 and 40. The output of mixer 28 on line 42 is filtered by a low pass filter 44, the filtered output of which is applied via line 46 as one input to coincidence gate means 48.

Coincidence gate means 48 is adapted to be enabled by output of amplifier 38 of frequency $f_2$ via line 40a to pass the output of filter 44 via gate 48 and line 50 to indicator means, preferably in the form of a chart recorder 52. Recorder 52 provides a visual presentation in the form of a trace 52a on chart paper moving at a predetermined rate which can permit ready correlation between the trace and the position of the search unit.

The output of filter 44 may also be passed by coincidence gate means 48 via line 50a to an amplitude threshold detector or Schmitt trigger 56. The output of trigger 56 is a voltage signal on line 58 to a relay 60. Relay 60 is connected, as shown by lines 62, 62a, respectively, to an alarm 64 and to a marker launcher 66. The former provides an audible and/or visible indicator, whereas the latter serves to launch a marker buoy, or the like, that will permit the system operators to return to a located wire 12 at a later time. Accordingly, a prolonged, uninterrupted search may be made to locate and mark numerous detected wires during a given sweep. Moreover, and as will presently be explained, the trace 52a on recorder 52 will provide a permanent record of such locations.

Figure 2:
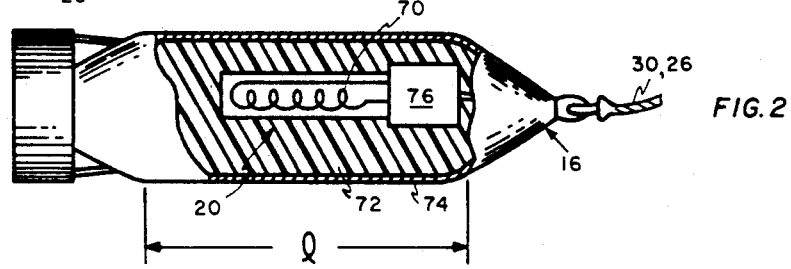
FIG. 2 is a diagrammatic sectional view of a search unit forming part of the system of FIG. 1.

Referring now to FIG. 2, the R.F. receiver 20 carried by search unit 16 is characterized by a tuned circuit including a coil 70 that serves as a receiving antenna for electromagnetic energy waves radiated by wire 12. Coil 70, which may have either an air core or a ferrite core, is surrounded by a material 72 that exhibits a propagation velocity for radio waves that is markedly different from the propagation velocity of the water medium in which the search unit 16 is to be used. Preferably the material 72, which may comprise any of a number of rigid plastics either solid or in rigid foamed condition, is characterized by a propagation velocity for radio waves which approaches that characteristic of air. The material 72 may be shaped to fit in a portion of a hull 74 of suitable material, such as plastic, that is reasonably transparent to electromagnetic wave energy, and which also serves to house various electronic elements, represented by block 76, which may include receiver tuning elements, amplifier 24, and such impedance matching means as may be necessary for transmission of received and amplified signals to the master vehicle. During operation, the search unit 16 is towed by a cable so as to drag along the bottom of the body of water where a wire 12 is expected to be lying, so that the search unit will actually contact and slide on the wire to be located. In so doing, the water path of radio wave transmission between wire 12 and coil 70 is interrupted for a time period dependent upon the length l of the search unit that comes into contact with the wire, and the speed at which the search unit is towed. During the period of contact the radio wave path of transmission is through the material 72 which, because of its difference in velocity of propagation of radio waves as compared to water propagation, provides the basis for an effective identification or classification of a response as being from a wire or object of the type being sought, all as will be more fully explained presently.

MODE OF OPERATION

Figure 3:
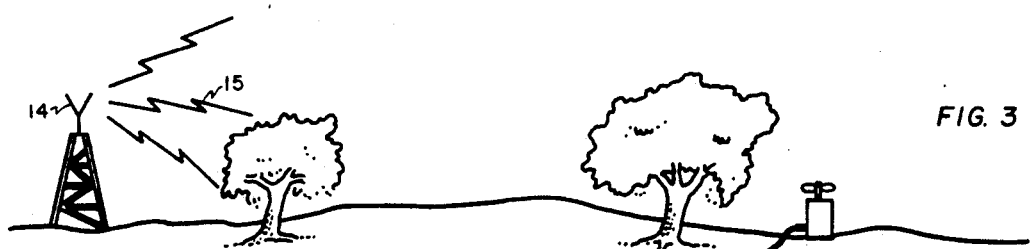
FIG. 3 is a quasi-perspective view illustrating a wire detecting system utilizing the method and apparatus of the invention to detect mine command cables.
Figure 3:
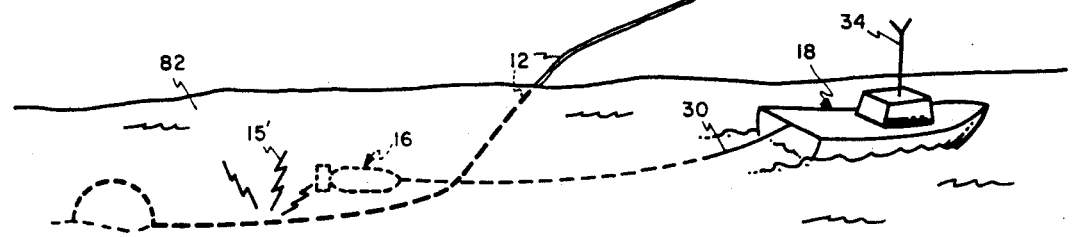

Consider, with reference mainly to FIG. 3, that transmitter 14 is broadcasting into the surrounding air medium electromagnetic energy or radio waves 15 having a carrier wave frequency of 1000 KH. Speaking in round numbers for purposes of illustration of the principles involved, the wave length $\lambda_a$ in air may be regarded as being 300 meters or about 1000 feet. These radio waves are received by the air exposed portion of wire 12 which retransmits into the surrounding water medium 82 radio waves 15' having the same frequency but, because of the different rate of propagation in water, having a wavelength substantially different than in air. In sea water having electrical conductivity of approximately 4 mhos/meter, at 1000 KH a wavelength is about 1.5 meters or 4.5 feet.

With a master vessel 18 carrying receiver 34 and towing search unit 16 at a speed of 20 knots or 34 feet/sec, receiver 34 will experience a maximum phase shift in the received radio waves of approximately 12°/sec of travel. Receiver 20 in search unit 16, however, will experience a phase shift of 1100°/sec of travel in the radio waves transmitted through the water from wire 12. Thus, the R.F. receiver 20 in search unit 16 will "see" a received frequency $f_1$ which is the sum (or difference, depending on whether the search unit is approaching or leaving the wire) of the carrier frequency (1000 KH) and the phase shift of 1100°/sec, that phase shift equalling about 3 Hz. At the same time the R.F. receiver 34 in vehicle 18 will see a received frequency $f_2$ which differs from the carrier frequency of 1000 KHz by a maximum of 12°/sec or 0.033 Hz. Accordingly, the difference between $f_1$ and $f_2$, which is the output frequency $f_3$ of mixer 28 will be a beat of approximately 3 Hz.

From the foregoing, it will be recognized that $f_3$ is, in effect, proportional to $d\phi/dt$, the rate of change of the phase $\phi$ relation between the radio waves 15' received through water and the radio waves 15 received through air. This beat frequency $f_3$ is passed by low pass filter 44 and readily displayed by strip chart recorder 52 as a direct indication that wire 12 is in the area of the search unit. This indication is the recorded wave portion 54a, best shown in FIG. 1. Now, when search unit 16 actually contacts and slides over the radiating wire, the water path of radio wave propagation diminishes to zero at which point the phase shift attributable thereto no longer exists. By choosing a material 72 to surround coil 70 that has a rate of propagation close to that of air, the beat frequency $f_3$ becomes so small as to be undetectable. Accordingly, when search unit 16 contacts wire 12, the trace 54 will abruptly change from the alternating indication 54a to a level indication 54b. The duration of level indication 54b will persist for a time period dependent upon the length l of the search unit that contacts the wire, and the speed of tow. In the example given, a search unit 16 having a dimension l of 4 feet will, at 20 knots, contact wire 12 for about 1/10 second. The trace portion 54b on recorder 52 will have a corresponding duration.

When search unit 16 leaves contact with wire 12, a water path of radio wave propagation is reestablished, with an attendant beat frequency $f_3$ on the order of 3 Hz reoccurring to produce a trace portion 54c.

The trace 54, with its characteristic changes provides a remarkably definite and readily identifiable indicator of the presence of a wire or other conductor which is partially exposed to air and partly submerged.

Because water, especially sea water, greatly attenuates radio frequency electromagnetic waves with distance, R.F. receiver 20 in the search unit 16 is effective to detect only those waves retransmitted by wire 12. Such retransmitted radio waves are of sufficient strength to have the desired effect on search unit 16 for a distance of as much as several feet from the first contact with the wire and a like distance after contact is left. While the trace 54 resulting from the foregoing circumstances may have portions 54a, 54b, and 54c totalling one second or less, the predictable sequence of characteristics is such as to provide an observer with a good degree of certainty in a determination that a wire has been found. Additionally, the output of mixer 28 via filter 44 and gate means 48 is sufficiently distinct upon the occurrence of a positive wire location to provide reliability in the operation of the alarm means 64 and marker launcher 66, if desired. Gate means 48 aids in providing discrimination against noise and false indications in that it requires simultaneous reception of an airborne signal of a predetermined magnitude by receiver 34 and comparison thereof with reception of a wire radiated signal by receiver 20.

In the case of fresh water use, the rate of phase shift detected at 20 knots for the signal received by receiver 20 would be approximately 220°/sec. Accordingly, the beat frequency $f_3$ would be reduced to about 0.7 Hz. However, the attenuation by fresh water is somewhat less so that reception of the wire radiated waves through water will occur for greater periods of time before and after contact of the wire by the search unit. Accordingly, portions 54a and 54c of the recorder trace will be prolonged and, by judicious adjustment of chart strip speed, the trace can be made to appear almost identical to one obtained in sea water. It is therefore evident that training of an operator to recognize a detection event in both fresh and salt water conditions is made easier.

Other comparison devices than mixer 28 can be used to detect or display the phase and/or frequency relationships of the radio signals received by the first and second receivers 20 and 34, respectively. For example, the received signals may be applied to the orthogonal plates of a cathode ray oscillograph to produce Lissajous patterns which can be interpreted by a skilled operator. In any event the limiting amplifiers 24, 38 serve to amplify the signals received respectively by receivers 20 and 34, as necessary without either overloading mixer 28 or other comparison means.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A system for locating electrically conductive objects having portions extending above and below a water medium where the above water portion is subjected to electromagnetic waves of radio frequency from a transmitter radiating into the atmosphere, said system comprising:

a search unit including first radio frequency receiver means, disposed for movement at a predetermined speed in said water medium along a course which will cause it to pass close to, or in contact with, possible locations of an electrically conductive object, for receiving radio frequency electromagnetic waves retransmitted into the water medium by the submerged portion of said electrically conductive object and for providing a corresponding first A.C. voltage signal having a first frequency;

second radio frequency receiver means, disposed in the atmosphere adjacent said water medium, for receiving said radio frequency electromagnetic waves directly through the atmosphere and for providing a corresponding second A.C. voltage signal having a second frequency; and comparison means, coupled to said first and second radio frequency receiver means, for combining said first and second A.C. voltage signals in such manner as to provide an output signal representative of a changing phase relationships between said first and second frequencies, which relationship is a function of the movement of said search unit.

2. A system as defined in claim 1, and further characterized by:

said search unit comprising tuned circuit means including coil means for selectively receiving retransmitted radio frequency waves of predetermined frequencies.

3. A system as defined in claim 2, and wherein said comparison means comprises:

mixer means for providing a third A.C. voltage signal having a third frequency characteristic of said changing phase relationship.

4. A system as defined in claim 3, and further comprising:

indicator means, coupled to said mixer means, for providing a physical indication of said third voltage signal.

5. A system as defined in claim 4, and wherein said search unit further comprises:

a layer of material disposed between said coil and said water medium, said material being characterized by radio wave velocity of propagation therein which is materially different from the velocity of radio wave propagation in said water medium, whereby said changing phase relationship when said search unit is in contact with said electrically conductive object is notably different from that when said water medium is between said electrically conductive object and said search unit.

6. A system as defined in claim 5 and wherein said indicator means comprises:

recorder means for providing a visible record of the output of said comparison means as a function of time.

7. A system as defined in claim 6, and wherein said indicator, means further comprises:

alarm means for providing a sensible signal in response to predetermined alterations in said third A.C. voltage signal.

8. A system as defined in claim 6 and further comprising:

marker releasing means for releasing location markers in response to predetermined alterations in said third A.C. voltage signal.

9. A system as defined in claim 6, and wherein:

said indicator means is coupled to said mixer means by Tow pass filter means for excluding signals above a predetermined low frequency.

10. A system as defined in claim 7, and wherein:

said alarm means is coupled to said low pass filter by gate means; and said gate means being enabled to pass the output of said filter means upon coincidence thereof with said second A.C. voltage signal.

11. A system for detecting the location of an electrically conductive object a first portion of which is exposed to radio waves of a predetermined frequency propagated through the air medium and a second portion of which is disposed in a water medium into which radio waves are retransmitted by said second portion, said system comprising in combination:

a search unit adapted to be towed at a predetermined speed in said water medium along a course which will cause it to pass close or in contact with, said second portion;

a towing vehicle attached by cable means to said search unit for towing thereof;

a first radio frequency receiver comprising an antenna carried by said search unit so as to receive said radio waves transmitted by said second portion and to provide a first A.C. signal having a frequency that differs from said predetermined frequency by an amount that is a function of the velocity of said radio wave propagation in said water medium and of said towing speed;

a second radio frequency receiver comprising an antenna carried by said towing vehicle so as to receive said radio waves propagated through said air medium and to provide a resulting second A.C. signal;

radio frequency mixer means, coupled to said first and second receivers, for providing a third A.C. signal having a frequency corresponding to the rate of change of phase of said second A.C. signal with respect to the phase of said first A.C. signal;

a low pass filter;

recorder means, coupled by said filter to said mixer means, for recording said third A.C. signal;

said search unit further comprising a layer of a radio wave propagating medium having a propagation velocity substantially different from that of said water medium, said layer being so disposed with respect to said first antenna that, when said search unit is towed into contact with said second portion of said electrically conductive object, radio waves travel from said second portion through said layer to said antenna without passing through said water medium, whereby at the times of making and breaking such contact said third A.C. signal changes materially in frequency.

12. A method of detecting the location of the underwater portion of an elongate electrical conductor having an above water portion subjected to airborne radio frequency electromagnetic wave energy, said method comprising the steps of:

moving a first radio frequency receiver, along an underwater path at a predetermined speed so as to receive radio frequency electromagnetic energy retransmitted by said underwater portion;

receiving said airborne electromagnetic wave energy with a second radio frequency receiver; and comparing the phase relationships of said radio frequency electromagnetic wave energy as received by said first and second receivers.

* * * * *